(No Model.) 2 Sheets—Sheet 1.

C. S. FIFIELD.
SEAM RUBBING MACHINE.

No. 386,241. Patented July 17, 1888.

WITNESSES:
W. H. Ford
Edward S. Beach

INVENTOR:
Charles S. Fifield,
by J. E. Maynadier.
his Atty.

(No Model.) 2 Sheets—Sheet 2.
C. S. FIFIELD.
SEAM RUBBING MACHINE.
No. 386,241. Patented July 17, 1888.
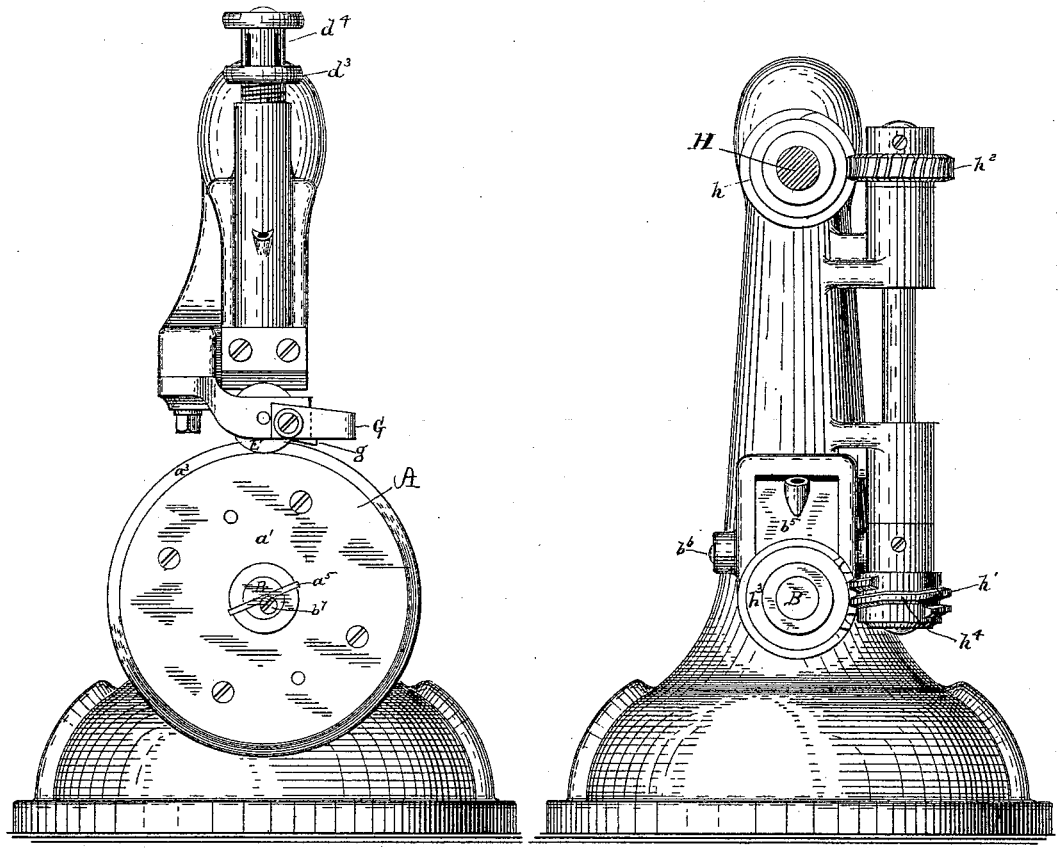
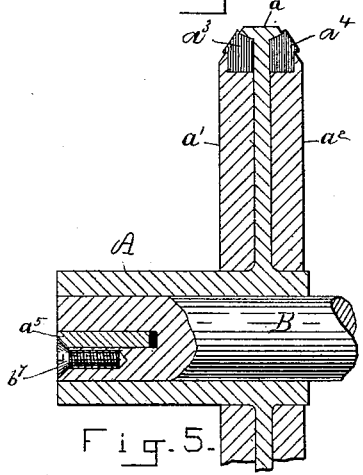
WITNESSES:
W. H. Ford.
Edward S. Beach.
INVENTOR:
Charles S. Fifield,
by J. E. Maynadier,
Atty.

UNITED STATES PATENT OFFICE.

CHARLES S. FIFIELD, OF REVERE, MASSACHUSETTS.

SEAM-RUBBING MACHINE.

SPECIFICATION forming part of Letters Patent No. 386,241, dated July 17, 1888.

Application filed November 14, 1885. Serial No. 182,831. (No model.)

*To all whom it may concern:*

Be it known that I, CHARLES S. FIFIELD, of Revere, in the county of Suffolk and State of Massachusetts, have invented certain new and useful Improvements in Seam-Rubbers, of which the following is a specification, reference being had to the accompanying drawings, making a part hereof, in which—

Figure 1:
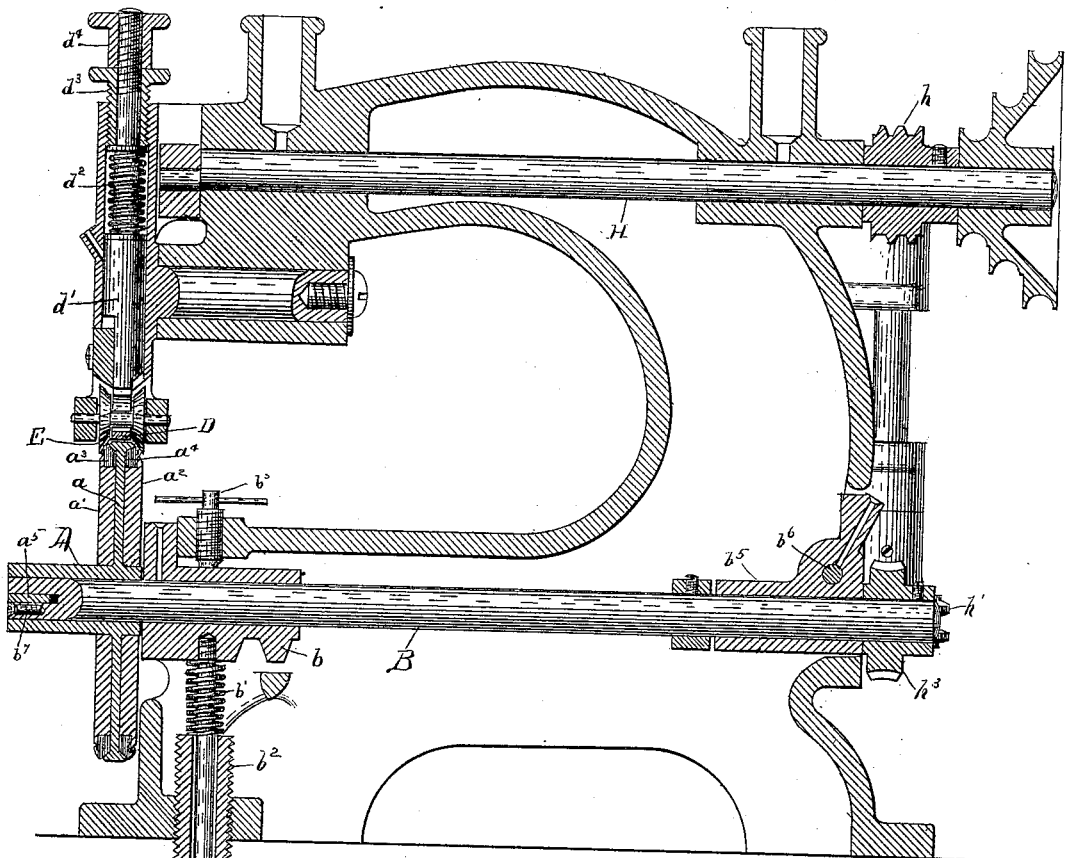
Figure 2:
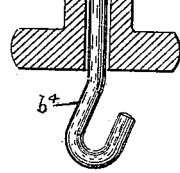

Figure 1 is a lengthwise section in a vertical plane. Fig. 2 is a perspective of the presser-foot and guide-fingers. Fig. 3 is a front elevation. Fig. 4 is a rear elevation. Fig. 5 is a sectional detail showing the construction of the support, and Fig. 6 a perspective of the rubber and its holder.

My invention relates to certain improvements in that class of machines known as "seam-rubbers," which consist, as usually made, of a rotary support, a rotary presser-foot, a vibrating rubbing-tool, and devices for guiding the seam to be rubbed. The rotary support has long been made with two grooves in its periphery, each of which was filled with vulcanized rubber vulcanized in place; and the first feature of my invention consists in a rotary support for a seam-rubber made of one central and two side disks and two rings or disks of vulcanized rubber clamped in place between the central and side disks, as fully shown in the drawings, wherein—

A represents my rotary support, $a$ being the central disk, $a'$ $a^2$ the side disks, and $a^3$ $a^4$ the rubber rings. The clamping-disks $a'$ $a^2$ are best held by screws, as shown, and the rubber is preferably in the form of rings, rather than disks, for cheapness. The extra screw-holes are to enable the clamping-disks to be more readily taken off when it is necessary to replace the vulcanized rubber, for after a time the vulcanized rubber will adhere with considerable force to the metal disks $a$ $a'$ $a^2$; but by screwing two of the screws into the extra screw-holes the disks $a'$ $a^2$ are readily removed.

My support A is a practical improvement on any other known to me, mainly because of the ease with which the vulcanized rubber, $a^3$ $a^4$, is replaced. Heretofore the supports were sent to the rubber-factory, where the worn-out vulcanized rubber was removed and new compound inserted and vulcanized in place. There are other practical advantages which will be plain to all skilled in the art.

Another feature of my invention consists in the combination of the movable box $b$ with a spring and stop. The shaft B of the rotary support A is mounted in the box $b$, which is adapted to be moved toward and away from the rubbing-tool D. The box $b$ is mounted in ways, and is forced toward tool D by a spring, $b'$, whose tension is adjusted by screw $b^2$. Stop $b^3$ is also a screw, so that the relation of the surface of the support A to the surface of the rotary presser-foot E can be nicely adjusted to suit the thickness of the stock which is passed between these surfaces. The box is connected to the treadle-rod $b^4$, so that the support A can be readily moved away from the foot E when the stop is to be put in or taken out of the machine. As the shaft B is long, the motion of the box $b^5$ need only be a slight tilt on the center $b^6$.

Another part of my invention relates to making the machine self-adjusting for that class of work in which the seam unites two pieces of different thicknesses, and consists in making the support A or the foot E, either or both, movable sidewise as well as rotary. In order to allow the support A to move sidewise, its hub is slotted and the shaft B is also slotted, and a piece of sheet-steel, $a^5$, is held in the slot in shaft B by means of the screw $b^7$, the projecting edges of the spline $a^5$ entering the slots in the hub of the support A, thus compelling support A to rotate with shaft B, and yet allowing sufficient side play to support A to suit a thicker piece of stock on one side than on the other.

It will be seen that the rotary presser-foot E can also move sidewise slightly, and this is for the same purpose as the like movement of the support A, as will be obvious.

In all other seam-rubbers known to me in which a rotary presser-foot is used bearing on both sides of the seam this foot has consisted of two conical disks, each on its own stud, in order to allow the rubbing-tool D to play between them. The pressure of these two disks upon the work when on the support A cramps the disks on their studs, and I have found that even when made of hardened steel they wear rapidly. Moreover, the cramping makes them run hard and is a serious defect in the feed. To remedy these difficulties, I make the two conical disks in one piece with or otherwise fast to a central core or body—that is, I make the rotary presser E in the shape of a common spool and cut away the rubbing-tool D to make room for the body of this spool-shaped presser E. This I regard as one of the valuable features of my invention, as it not only reduces the wear and makes this part of the machine far more durable, but it also makes the feed far more perfect.

As the working-face of the rubbing-tool D wears away so that it must be replaced, I make it with a tang, $d$, to enter a socket in its holder $d'$, and this U-shaped tool, with a tang projecting from one of its legs, is also new with me.

Another part of my invention relates to the manner of mounting the tool-holder $d'$, and consists in the combination with it of the spring $d^2$ and the two screws $d^3$ $d^4$, one of which, $d^3$, serves to adjust the tension of the spring $d^2$, while the other, $d^4$, serves to adjust the face of the rubbing-tool D with relation to the face of the support A. This compound adjustment is new with me and enables the spring-pressure of the tool to be nicely adjusted for different kinds of work without danger of the tool rubbing against the support when the work is not between them, for, as will be clear, the machine must commonly be kept in motion during the interval between taking out one piece of work and putting in another.

The guide-fingers G are old in themselves, but heretofore their lower edges, $g$, have been substantially at a tangent to the periphery of support A, and this made it necessary for the operator to exercise a good deal of care in guiding the seam between the fingers, as (if the operator was inattentive) the guide-fingers got somewhat crosswise of the seam and then no longer acted as guides, but threw the work away. This part of my invention consists in guide-fingers whose lower edges, $g$, are substantially parallel with the periphery of support A, as shown, and by this feature I do away with all necessity of care on the part of the operator in guiding the work, for when the seam is once properly inserted it will be automatically guided by my guide-fingers without aid from the operator.

The feed shown also constitutes a part of my invention. The main shaft H should run about two thousand times per minute in order to give the rubbing-tool about four thousand motions over the seam, (which I find gives practically the best results;) but obviously the support A, which is also the feed-wheel, must not run nearly so fast. I therefore use two worms, $h$ $h'$, and two worm-gears, $h^2$ $h^3$, as shown, to reduce the speed of the shaft B; but in order to retain a small portion of the seam at regular and short intervals stationary under the rubber, which I esteem necessary for the highest degree of perfection in seam-rubbing, I make a portion, $h^4$, of one of the worm-gears (it is immaterial which, but in this instance the lower one, $h'$) straight instead of slanting, and this causes the feed to be intermittent—that is, holds the seam still while the rubber is at work upon it, then moves the seam forward a short distance, and again holds it still, and so on.

The operation of my machine will be clear to all skilled in the art without further description.

What I claim as my invention is—

1. In a seam-rubber, the support A, composed of the metal disks $a$ $a'$ $a^2$ and the rings $a^3$ $a^4$, of vulcanized rubber or like material, clamped in place, substantially as set forth.

2. In a seam-rubbing machine, the movable box $b$ of the shaft B, carrying the support A, in combination with the adjustable spring $b'$ and stop $b^3$, substantially as and for the purpose specified.

3. In a seam-rubber, the support A and presser E, mounted, substantially as described, to move sidewise relatively either to the other, to suit work in which pieces of different thicknesses are joined by a seam, substantially as described.

4. In a seam-rubbing machine, the spool-shaped presser E, in combination with the U-shaped rubbing-tool D, substantially as described.

5. In a seam-rubbing machine, the seam-rubbing tool D, made U shaped and having tang $d$ projecting from one of its legs, substantially as described.

6. In a seam-rubber, the tool-holder $d'$, in combination with the spring $d^2$ and the adjusting-screws $d^3$ $d^4$, substantially as and for the purpose specified.

7. In a seam-rubber, the guide-fingers G, with their lower edges, $g$, parallel with the periphery of the support A, substantially as and for the purpose specified.

8. In a seam-rubber, the combination of main shaft H and feed-shaft B by means of worms $h$ $h'$ and their gears $h^2$ $h^3$, one of the worms having a straight portion, $h^4$, as and for the purpose specified.

CHARLES S. FIFIELD.

Witnesses:
J. E. MAYNADIER,
EDWARD S. BEACH.